(12) United States Patent
Saito et al.

(10) Patent No.: US 11,306,786 B2
(45) Date of Patent: Apr. 19, 2022

(54) UNIVERSAL JOINT AND PROPELLER SHAFT

(71) Applicants: SHOWA CORPORATION, Saitama (JP); HONDA MOTOR CO., LTD., Tokyo (JP)

(72) Inventors: Yuta Saito, Tochigi (JP); Takahiro Nakayama, Tochigi (JP); Sato Kuraishi, Saitama (JP)

(73) Assignees: HITACHI ASTEMO, LTD., Ibaraki (JP); HONDA MOTOR CO., LTD., Tokyo (JP)

( * ) Notice: Subject to any disclaimer, the term of this patent is extended or adjusted under 35 U.S.C. 154(b) by 238 days.

(21) Appl. No.: 16/496,330

(22) PCT Filed: May 17, 2017

(86) PCT No.: PCT/JP2017/018532
§ 371 (c)(1),
(2) Date: Sep. 20, 2019

(87) PCT Pub. No.: WO2018/198383
PCT Pub. Date: Nov. 1, 2018

(65) Prior Publication Data
US 2020/0032852 A1     Jan. 30, 2020

(30) Foreign Application Priority Data
Apr. 25, 2017   (JP) .............................. JP2017-085967

(51) Int. Cl.
*F16D 3/41*     (2006.01)
*F16D 3/38*     (2006.01)

(52) U.S. Cl.
CPC ............... *F16D 3/41* (2013.01); *F16D 3/382* (2013.01); *F16D 3/385* (2013.01); *F16D 3/387* (2013.01)

(58) Field of Classification Search
CPC . F16D 3/41; F16D 3/382; F16D 3/387; F16D 3/385
(Continued)

(56) References Cited

U.S. PATENT DOCUMENTS 1,364,311 A  *  1/1921  Peters ....................... F16D 3/40
                                                                464/136
2013/0306801 A1   11/2013  Hill

FOREIGN PATENT DOCUMENTS

EP          1277980 A2      1/2003
GB             457418   *  11/1936 .................... 464/135
(Continued)

OTHER PUBLICATIONS

Universal Joint and Driveshaft Design Manual, AE-7, Society of Automotive Engineers, Warrendale, PA, Chapter 7, (Year: 1979).*

*Primary Examiner* — Greg Binda
(74) *Attorney, Agent, or Firm* — Kenealy Vaidya LLP

(57) ABSTRACT

A cross joint comprises a flange yoke and a stab yoke, each comprising a based end portion and a pair of arm portions having a shaft hole and extending from both sides of the base end portion, and a spider having a first shaft fitted into the shaft hole of the flange yoke and a second shaft fitted into the shaft hole of the stab yoke, wherein the cross joint further comprises a flexing limiting portion, which limits a flexing angle of the cross joint due to mutual contact of a protruding portion of the base end portion and a flange portion of the spider when the flange yoke is flexed to a predetermined angle.

8 Claims, 9 Drawing Sheets

(58) Field of Classification Search
USPC .................................................. 464/134, 136
See application file for complete search history.

(56) References Cited

FOREIGN PATENT DOCUMENTS

| | | |
|---|---|---|
| JP | S35-20600 Y1 | 8/1960 |
| JP | S53-74545 U | 6/1978 |
| JP | H08-198123 A | 8/1996 |
| JP | 2008-184073 A | 8/2008 |
| JP | 4945253 B2 | 6/2012 |
| JP | 2013-194834 A | 9/2013 |
| JP | 2016-133212 A | 7/2016 |
| WO | 2018/198383 A1 | 11/2018 |

* cited by examiner

UNIVERSAL JOINT AND PROPELLER SHAFT

CROSS-REFERENCE TO RELATED APPLICATIONS

This application is a U.S. National Stage Application under 35 U.S.C § 371 of International Patent Application No. PCT/JP2017/018532 filed May 17, 2017, which claims the benefit of priority to Japanese Patent Application No. 2017-085967 filed Apr. 25, 2017, the disclosures of all of which are hereby incorporated by reference in their entireties.

TECHNICAL FIELD

The present invention relates to a universal joint and a propeller shaft.

BACKGROUND ART

A propeller shaft of an automobile is used for transmitting a power, which is generated by a prime mover installed in the front side of a vehicle and of which speed is reduced by a transmission unit, to a final drive unit installed in the rear side of a vehicle. Since the distance between the transmission unit and the final drive unit is not constant, and since the rotational center of both units do not coincide to each other, there is provided a universal joint directly after the transmission unit and directly before the final drive unit. The propeller shaft is constructed with steel pipes except the portion of the universal joint. Since the propeller shaft has a tendency that its resonant frequency becomes lower when the length of the propeller shaft exceeds a certain length, and since the resonant frequency should not be in the range of practical use, occasionally the propeller shaft is divided halfway and a center universal joint is provided at the portion of the division. In this case, a center bearing is arranged in a proximity of the center universal joint for supporting the propeller shaft on the vehicle body side.

When a vehicle had a forward collision, in order to absorb the impact due to the collision by the body panel including the engine room, it would be necessary to have the prime mover and the transmission unit to be receded promptly and the body to be deformed for absorption of the impact. Behind the transmission unit extends the propeller shaft in front-rear direction of the vehicle, which propeller shaft may block the prime mover and the transmission unit to recede when it happens to work as a so-called "a prop stick" and finally may cause a blockage of body deformation and an increase of impact to the passengers. Therefore, a weak portion, which contracts or falls out when a predetermined load is applied, is set up in the propeller shaft. However, when a flexing angle of the universal joint is large, there is a risk that the propeller shaft may be largely bent at the portion of the universal joint, by which the load cannot be applied to the weak portion.

To cope with this problem, in the patent literature 1 (PTL1), a projecting portion for each arm of a pair of stab yokes configuring the universal joint, is formed on its lateral side, and the projecting portions interfere with each other when a predetermined flexing angle is reached, by which the flexing angle is limited.

On the other hand, in the patent literature 2 (PTL2), it is described about a propeller shaft, comprising: a yoke to which a spider is mounted, a flange which extends in a radial direction from the yoke to outer side and is fastened to a companion flange with bolts.

CITATION LIST

Patent Literature

Patent Literature 1 (PTL1): Japanese Patent No. 494525362

Patent Literature 2 (PTL2): Japanese Open-laid Patent Application No. 2013194834A

SUMMARY OF INVENTION

Technical Problem

According to the technology described in PTL1, there is a problem that the size of the yoke becomes larger and its weight increases together, since the projecting portions are formed on the lateral sides of the arms.

Further, when the technology of PTL1 is applied to a flange yoke, the projecting portions are formed in the proximity of the bolt holes of the flange, through which the bolts and bolt fastening tools may occasionally interfere with the projecting portions. In order to prevent this problem, it is necessary to enlarge the pitch circle diameter of the bolts. However, as the pitch circle diameter is enlarged, the outer diameter of the flange becomes larger, which causes a weight increase and also makes it difficult to keep a clearance between the flange and a surrounding member such as a member on the vehicle side.

The present invention is created for solving the above problem and aims at providing a universal joint and a propeller shaft which employ a simple structure and enable limiting of the flexing angle along with limiting weight increase.

Solution to Problem

In order to solve the above problem, the present invention is a universal joint comprising a based end portion, a first yoke and a second yoke, each comprising a pair of arm portions having a shaft hole and extending from both sides of the base end portion, and a spider having a first shaft fitted into the shaft hole of the first yoke and a second shaft fitted into the shaft hole of the second yoke, wherein the universal joint further comprises a flexing limiting portion, which limits the flexing angle of the universal joint due to mutual contact of the base end portion and the spider when at least one yoke among the first and second yokes is flexed to a predetermined angle.

According to the present invention, since the universal joint includes the flexing limiting portions which limit the flexing angle due to mutual contact of the base end portion of the yokes and the spider, along with limiting a weight increase by employing a simple structure, a flexing angle of a yoke can be limited.

Further, the present invention is characterized in that the flexing limiting portion on a side of a yoke is constituted with a protruding portion formed at a base end portion of the yoke.

According to the present invention, it is possible to limit the flexing angle by employing a simple structure without applying a considerable shape modification to the yoke of an existing specification.

Further, the present invention is characterized in that a bearing is provided between the spider and the shaft hole, the spider is formed with a flange portion supporting a sealing member for the bearing, and the flexing limiting portion on a side of the spider constituted with a flange portion of a shaft which pivotally supports the other yoke.

According to the present invention, it is not necessary to provide the spider of an existing specification with a new contact portion for flexing limiting, and the flange portion can have both functions, supporting function for the sealing member on the flange portion and flexing limiting function for the yoke. Since the flange portions are formed to have a larger diameter than that of other circumferential surface of the shaft, correspondingly the protruding height of the protruding portion of the yoke for contacting can be limited.

Further, the present invention is characterized in that an outer diameter of the flexing limiting portion is larger than an outer diameter of the sealing member.

According to the present invention, it is possible that only the flange portion, which is a predetermined contact portion, can be surely contacted without an interference of the protruding portion with the sealing member.

Further, the present invention is characterized in that an extension portion, which extends to base end portion of one yoke and comes into contact with the base end portion, is formed on the flange portion of the flexing limiting portion.

According to the present invention, along with keeping the outer diameter of the flange portion approximately same as the outer diameter of the sealing member, it is possible that the protruding portion can be surely contacted only to the extension portion preventing the protruding portion from interference with the sealing member. Since it is sufficed that the extension portion is formed only on a part of the flange portion, it is possible to limit weight increase.

Further, the present invention is characterized in that the one yoke is a flange yoke having a flange which extends in radial direction from a base end portion to outer side and is fastened to a transmission member with bolts.

According to the present invention, it is not necessary to form a projecting portion on a lateral side of the arms as the flexing limiting portion. Therefore, there does not arise a problem that the pitch circle diameter of the bolts is set to be larger for preventing an interference with the bolts and the bolt fastening tools, by which it is enabled to limit a size increase and a weight increase of the flange.

Advantageous Effect of the Invention

According to the universal joint and the propeller shaft related to the present invention, it is possible to limit the flexing angle, employing a simple structure, along with limiting weight increase.

BRIEF DESCRIPTION OF DRAWINGS

FIGS. 4A and 4B represent a front view and a plan view, respectively.

DESCRIPTION OF EMBODIMENTS

Figure 1:
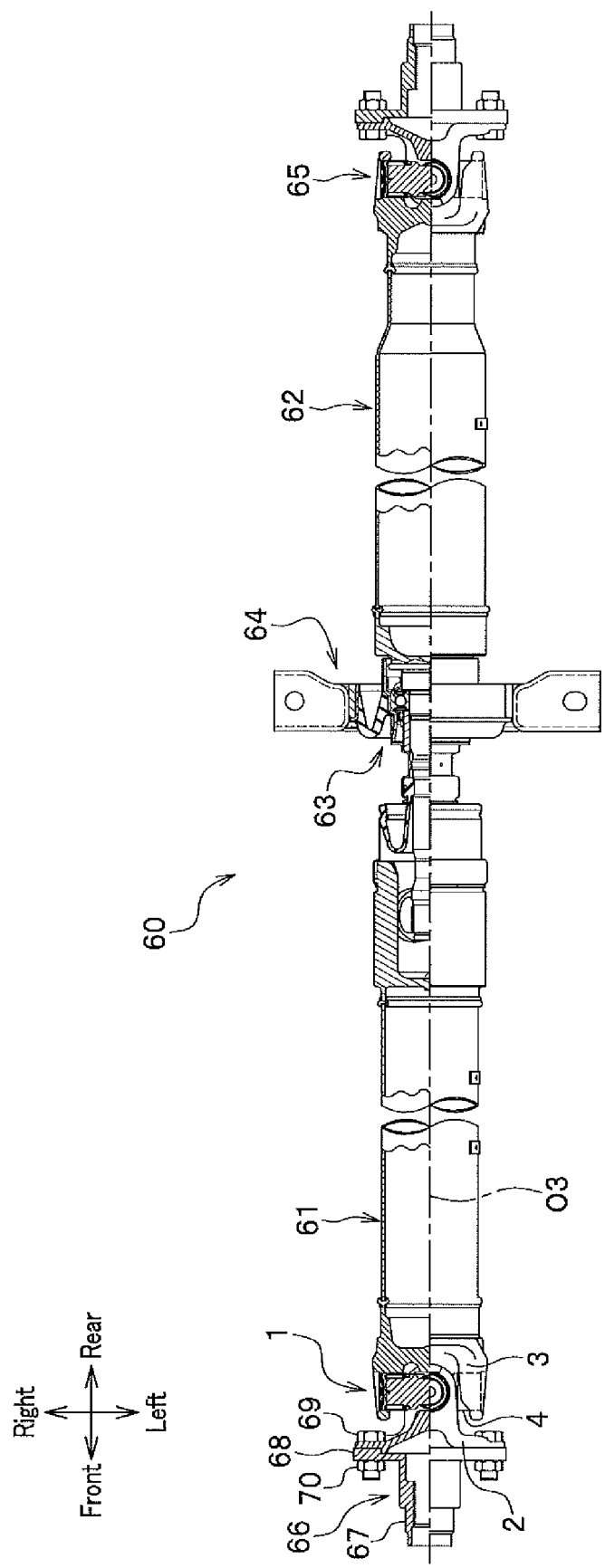
FIG. 1 shows a plan view of a propeller shaft of the present invention.

In FIG. 1, a propeller shaft 60 is installed, for example, on a rear-drive four-wheel vehicle. The propeller shaft 60 is a power transmission shaft, transmitting a power outputted from a transmission unit (not shown in the figure) arranged in the front side of the vehicle to the final drive unit (not shown in the figure) arranged in the rear side of the vehicle, and extending in front-rear direction of the vehicle. The propeller shaft 60 has, for example, a two-piece structure, which includes a first propeller shaft 61 on the front side, a second propeller shaft 62 on the rear side, a constant-velocity joint 63 coupling the first propeller shaft 61 and the second propeller shaft 62, a center bearing unit 64 supporting a propeller shaft 60 halfway thereof on the vehicle body, a front side universal joint 1, and a rear side universal joint 65. Apart from this configuration, the propeller shaft 60 may have a configuration in which the constant-velocity joint 63 is not included and the first propeller shaft 61 and the second propeller shaft 62 are coupled with a spider joint.

The universal joint 1 couples a companion flange 66 with a frontend portion of the first propeller shaft 61. The companion flange 66 comprises a cylinder portion 67 and a ring-shaped circular disk 68 extending in a radial direction from the rear side of the cylinder portion 67 to outer side. An involute spline is formed on the cylinder portion 67, and the cylinder portion 67 is coupled with an output shaft of the transmission unit. The circular disk portion 68 has bolt holes through which the bolts 69 are inserted.

In the following, an embodiment, in which the present invention is applied to a universal joint 1, is explained. Besides, in the following explanations, the axial center of one direction of a spider 4 (i.e. rotation axis center of a flange yoke 2), which will be described later, is denoted as O1, the axial center of another direction of the spider (i.e. rotation axis center of a stab yoke 3) is denoted as O2, and the axial center, which runs through the intersection point of the axial center O1 and the axial center O2 and is perpendicular to both axial centers O1, O2 (i.e. the axial center of the propeller shaft 60), is denoted as O3.

First Embodiment

Figure 2:
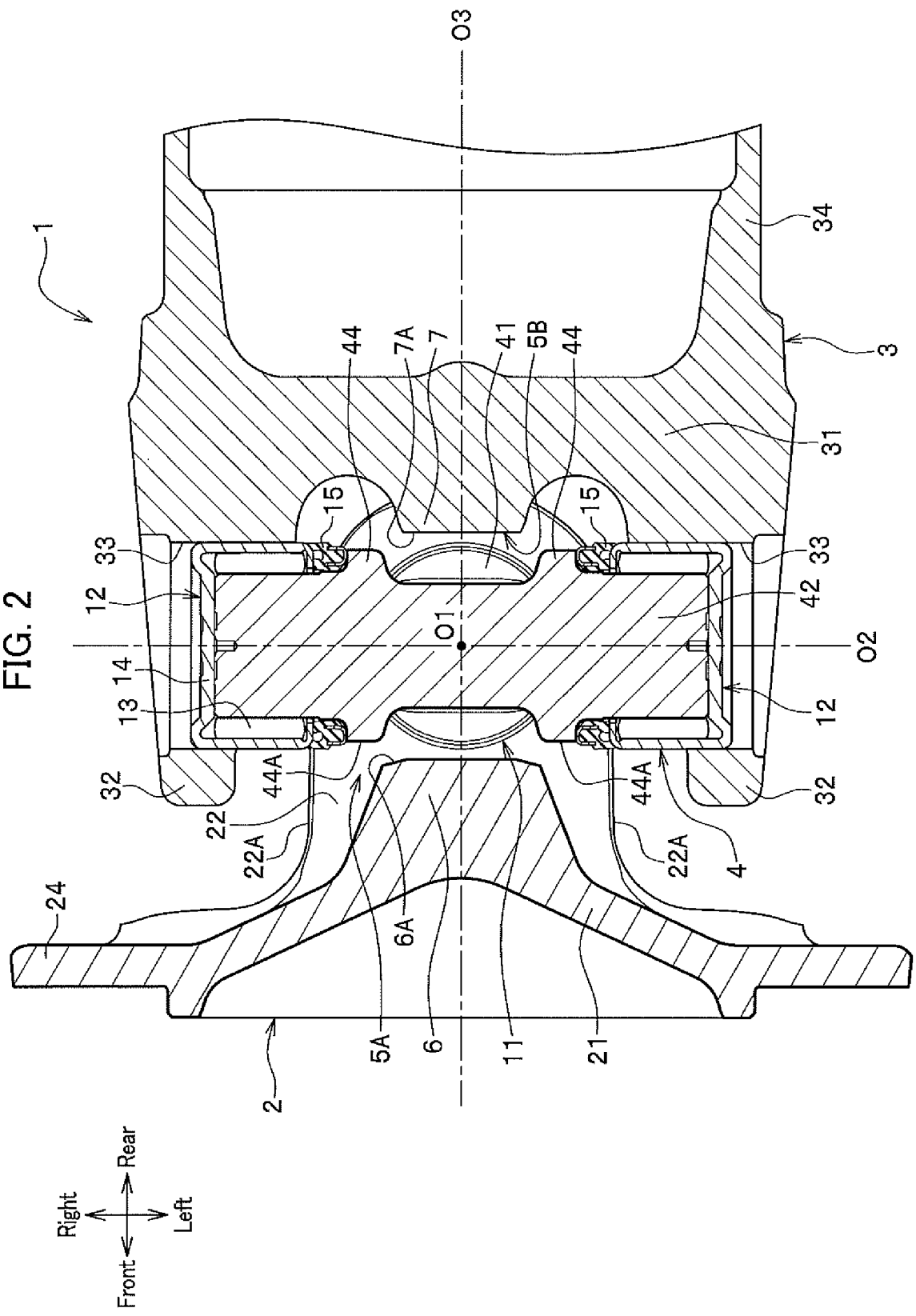
FIG. 2 shows a horizontal cross section of a universal joint of a first embodiment.
Figure 3:
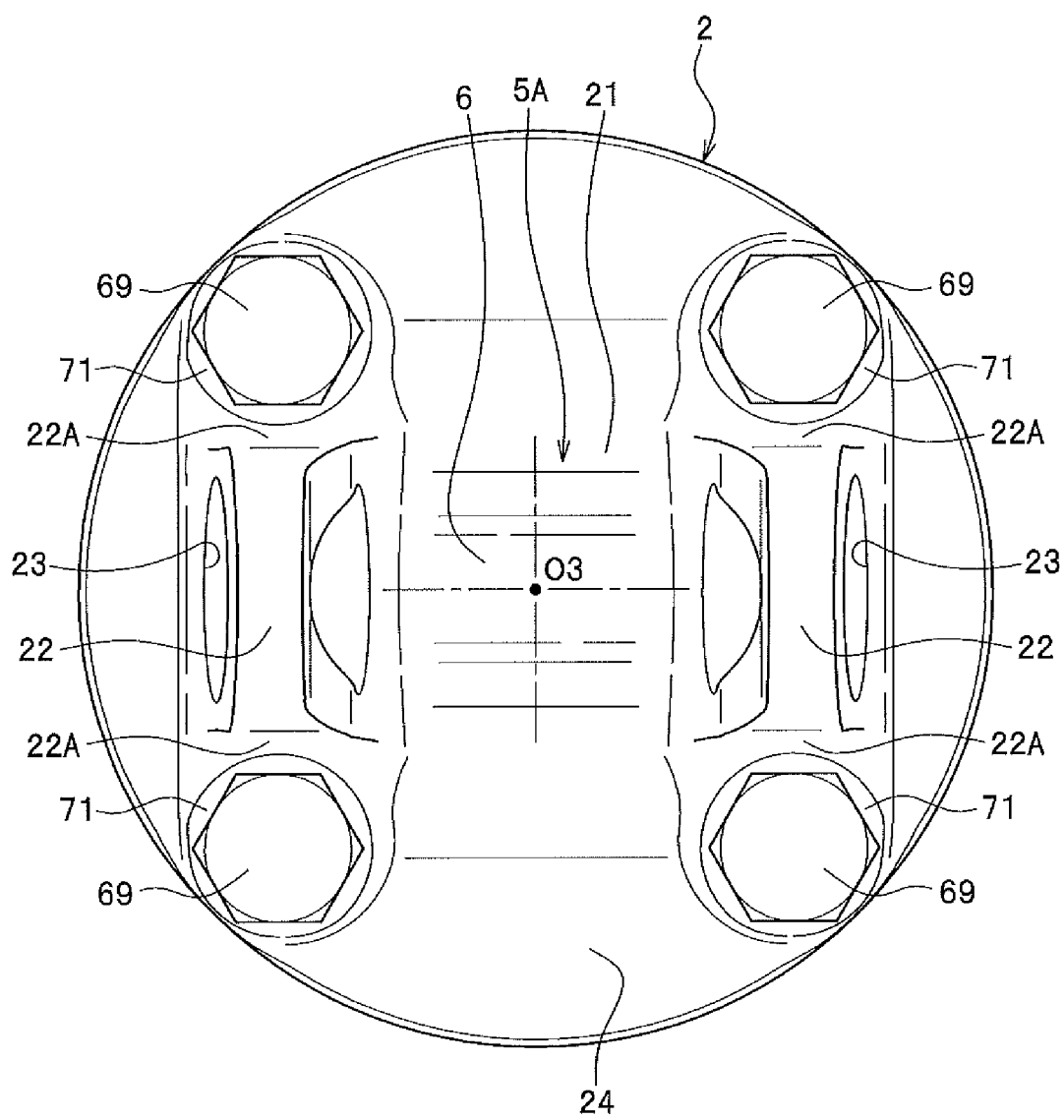
FIG. 3 shows a rear view of a flange yoke of a first embodiment.
Figure 4A:
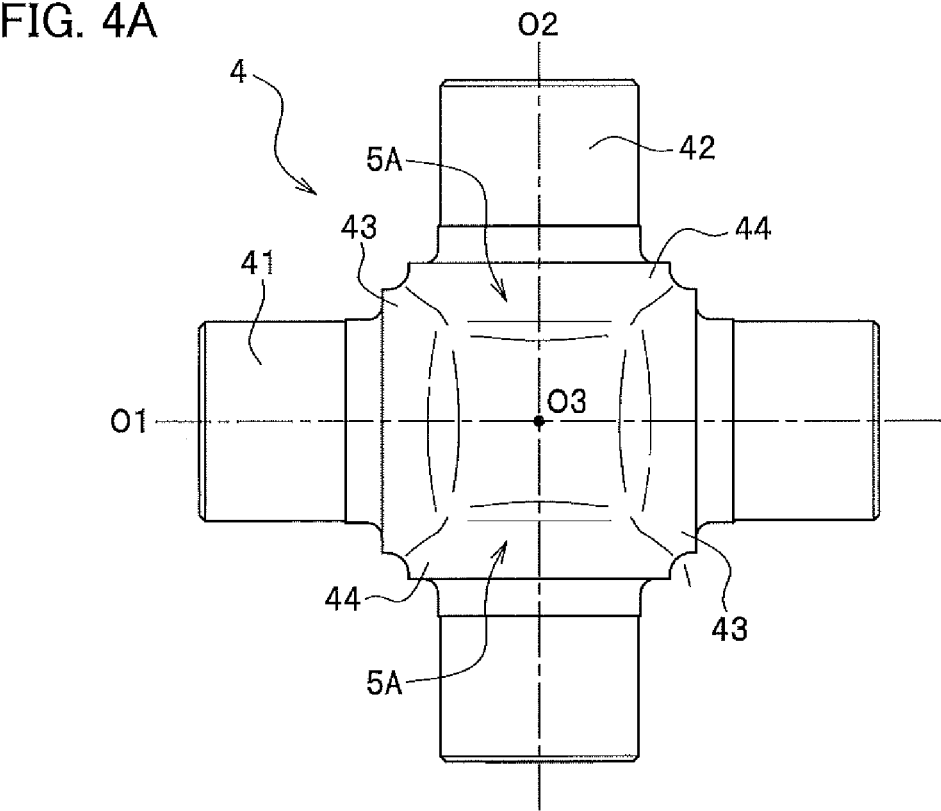
FIGS. 4A and 4B are explanatory drawings of a spider of the first embodiment, where
Figure 4B:
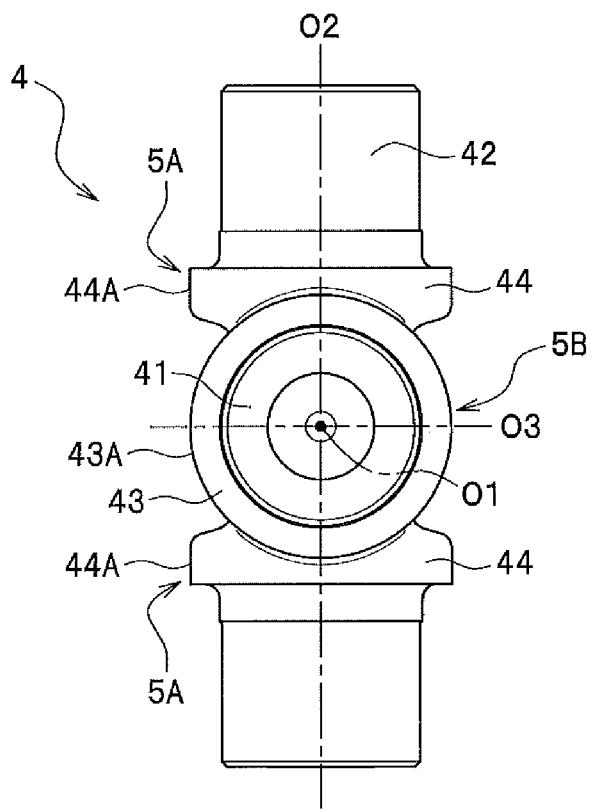

Referring to FIG. 2, the universal joint 1 comprises a flange yoke (first yoke) 2, a stab yoke (second yoke) 3, and a spider 4. The flange yoke 2 comprises a base end portion 21 extending in a direction to intersect with the axial center O3, a pair of arm portions 22 extending from both sides of the base end portion 21 to backward in an opposing manner to each other and each having a shaft hole 23 (see FIG. 3), and a flange 24 fastened with bolts 69 and nuts 70 (see FIG. 1) to an opposing transmission member, i.e. to the circular disk portion 68 of the companion flange 66. Though the flange 24, as shown in FIG. 3, has a circular shape when seen in the direction of the axial center O3, it may have a polygonal shape such as a general square shape of which sides are defined between the seating faces 71 of the bolts 69. The four seating faces 71 are formed in the proximities of the respective root portions of the side portions 22A of the arm portions 22.

In FIG. 2, the stab yoke 3 includes a base end portion 31 extending in a direction perpendicular to the axial center O3, a pair of arm portions 32 extending from both sides of the base end portion 31 to backward in an opposing manner to each other and each having a shaft hole 33, and a cylinder portion 34 extending from the base end portion 31 to backward. The backend of the cylinder portion 34 is bonded with friction welding and the like to the frontend of the first propeller shaft 61 as shown in FIG. 1.

Referring to FIGS. 2, 4A, 4B, 5, the spider 4 is so formed that the first shaft 41 on one side and the second shaft 42 on the other side cross orthogonally to each other. The first shaft 41 is fitted at its both ends into a pair of shaft holes 23, 23 of the flange yoke 2 via the bearing 11 (see FIG. 3). As shown in FIG. 2, the second shaft 42 is fitted at its both ends into a pair of shaft holes 33, 33 of the stab yoke 3 via the bearing 12. Namely, the first shaft 41 configures a shaft pivotally supporting the flange yoke 2, and the second shaft 42 configures a shaft pivotally supporting the stab yoke 3.

The bearings 11, 12 are constituted with a needle roller bearing having a plurality of rollers 13 and a shell 14. Since one side of the shell 14 is closed like a lid, for the bearings 11, 12, a ring-shaped sealing member 15 is provided to the other side of the shell 14, namely only to the insertion sides of the first shaft 41 and the second shaft 42. The sealing members 15 are installed so that they are fitted onto the first shaft 41 and the second shaft 42. In the first shaft 41, a pair of flange portions 43 are concentrically formed to support the sealing members 15 for limiting a movement in direction to the axial center O1. Similarly, in the second shaft 42, a pair of flange portions 44 are concentrically formed to support the sealing members 15 for limiting a movement in direction to the axial center O2. The outer diameters of the flange portions 43, 44 and the outer diameters of the sealing members 15 are of approximately same dimensions.

The basic construction of the universal joint 1 is as explained above, in which the flange yoke 2 can be flexed against the axial center O3 by rotation around the axial center O1, and the stab yoke 3 can be flexed against the axial center O3 by rotation around the axial center O2.

(Flexing Limiting Portions 5A, 5B)

In FIG. 2, the universal joint 1 comprises a flexing limiting portion 5A which limits the flexing angle of the flange yoke 2 due to a mutual contact of the base end portion 21 and the spider 4 when the flange yoke 2 is flexed to a predetermined angle. Similarly, the universal joint 1 comprises a flexing limiting portion 5B which limits the flexing angle of the flange yoke 3 due to a mutual contact of the base end portion 31 and the spider 4 when the flange yoke 3 is flexed to a predetermined angle.

Figure 5:
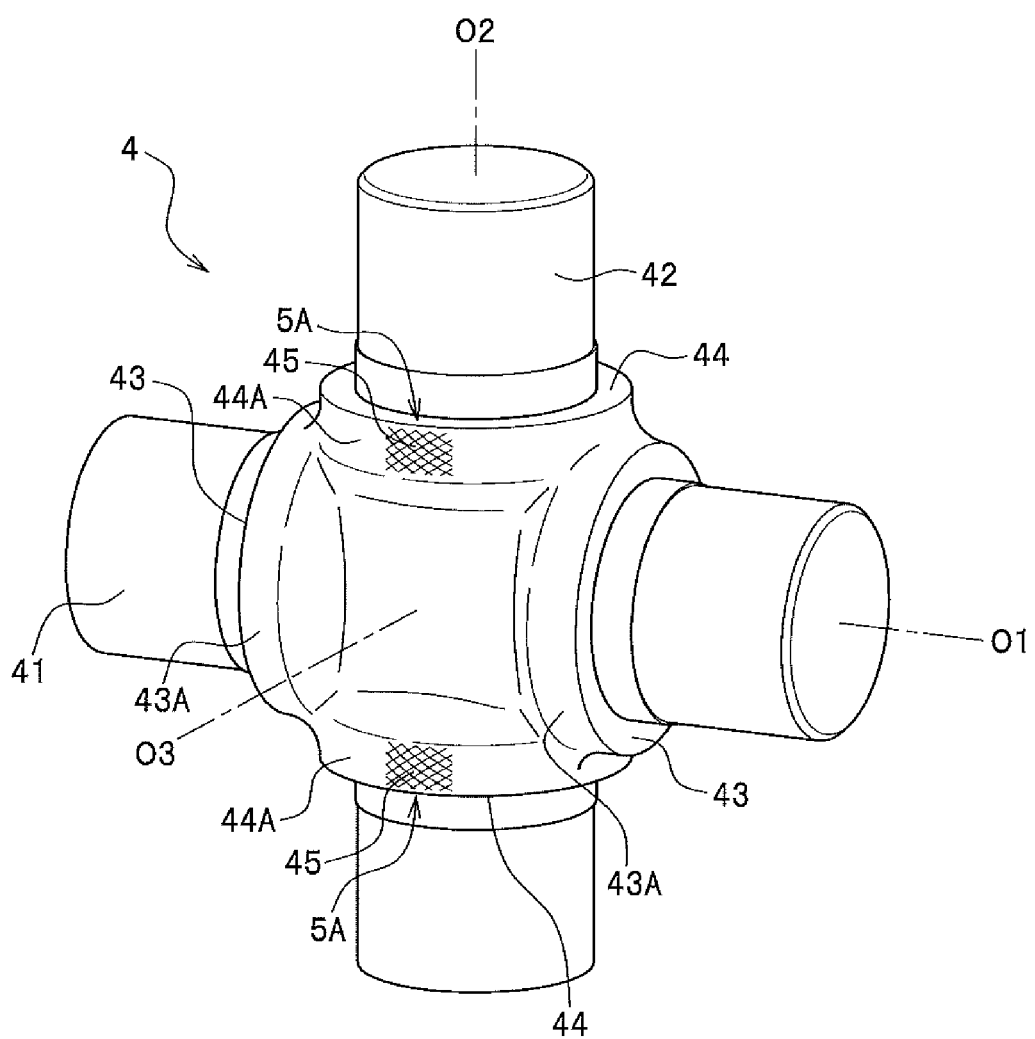
FIG. 5 shows an external perspective view of the spider of the first embodiment.

In the flange yoke 2, a protruding portion 6 is formed around the center of the base end portion 21 towards the rear side, namely towards the spider 4. The protruding portion 6 shows a general square frustrum shape which reduces its cross section towards its forefront. The protruding portion 6 and the flange portions 44 of the second shaft 42, namely which second shaft is the shaft pivotally supporting the stab yoke 3 that is another yoke against the flange yoke 2, configure the flexing limiting portion 5A which limits the flexing angle of the flange yoke 2 by their mutual contact. More specifically, it is so configured that the forefront surface 6A of the protruding portion 6 and the circumferential surface 44A of the flange portion 44 come into contact, when the flange yoke 2 is flexed by a predetermined angle. The reference number 45 in FIG. 5 shows a contact location to the forefront surface 6A of the protruding portion 6.

FIG. 2 shows that, in the stab yoke 3, a protruding portion 7 is formed around the center of the base end portion 31 towards the front side, namely towards the spider. Again, the protruding portion 7 shows a general square frustrum shape which reduces its cross section towards its forefront. The protruding portion 7 and the flange portions 43 of the first shaft 41, namely which first shaft is the shaft pivotally supporting the flange yoke 2 that is another yoke for the stab yoke 3, configure the flexing limiting portion 5B which limits the flexing angle of the flange yoke 2 by their mutual contact (refer to FIGS. 4A, 4B, and 5). More specifically, it is so configured that the forefront surface 7A of the protruding portion 7 and the circumferential surface 43A of the flange portion 43 come into contact, when the stab yoke 3 is flexed by a predetermined angle.

Effect of Embodiment

Figure 6:
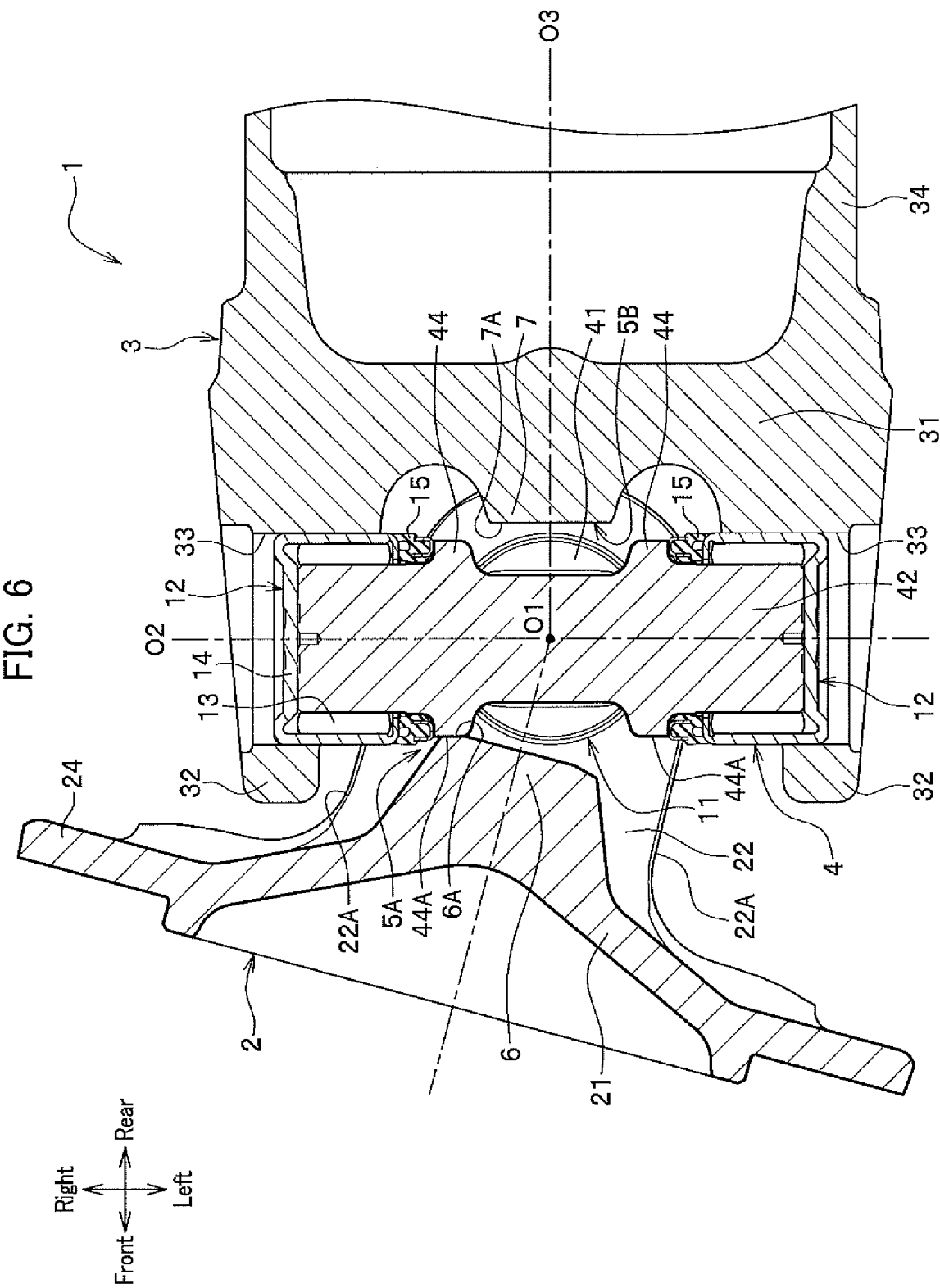
FIG. 6 is an explanatory drawing for functioning of the universal joint of the first embodiment.

As shown in FIG. 6, when the flange yoke 2 is rotated to one side about the axial center O1 leading to a flexing, the forefront surface 6A of the protruding portion 6 comes into contact with the circumferential surface 44A of one flange portion 44. When the flange yoke 2 is rotated to the other side about the axial center O1 leading to a flexing, the forefront surface 6A of the protruding portion 6 comes into contact with the circumferential surface 44A of the other flange portion 44. Thereby, the flexing is limited for the flange yoke 2 not to exceed a predetermined angle to one side and to the other side.

Further, though not shown in the figure, when the stab yoke 3 is rotated about the axial center O2 to one side leading to a flexing, the forefront surface 7A of the protruding portion 7 comes into contact with the circumferential surface 43A of the flange portion 43. When the stab yoke 3 is rotated about the axial center O2 to the other side leading to a flexing, the forefront surface 7A of the protruding portion 7 comes into contact with the circumferential surface 43A of the other flange portion 43. Thereby, the flexing is limited for the flange yoke 2 not to exceed a predetermined angle to one side and to the other side.

According to the universal joint 1 comprising the flexing limiting portions 5A, 5B as described above, it is possible to limit easily the flexing angles of the flange yoke 2 and the stab yoke 3 employing a simple structure, along with limiting weight increase of the yokes. In particular, in the flange yoke 2, in case that the side portion 22A of the arm portion 22 and the seating faces 71 are close to each other, if an angle limiting portion is formed at a side portion 22A of an arm portion 22 to project therefrom, the bolts 69 or the bolt fastening tool may occasionally interfere with such projecting portion. In order to prevent this interference, it is necessary to increase the pitch circle of the bolts 69, which leads to a size increase and a weight increase of the flange 24. On the contrary, according to the flexing limiting portion 5A of the present invention, since it is not necessary to form a projecting portion at the side portion 22A of the arm portion 22, the problem of a larger diameter of a pitch circle of the bolts 69 does not occur, and therefore it is possible to limit the size increase and the weight increase of the flange 24.

When the flexing limiting portion 5A on a side of the flange yoke 2 is constituted with a protruding portion 6 formed on the base end portion 21, or when the flexing limiting portion 5B on a side of the stab yoke 3 is constituted with a protruding portion 7 formed on the base end portion 31, it is possible to limit the flexing angle using a simple structure, without a necessity to apply a major modification to the flange yoke 2 and the stab yoke 3 of the existing specification.

When, for the flange yoke 2, the flexing limiting portions 5A, 5B on a side of the spider 4 is constituted with the flange portions 44 of the second shaft 42, which pivotally supports the other stab yoke 3, and, for the stab yoke 3, when they are constituted with the flange portions 43 of the first shaft 41, which pivotally supports the other stab yoke 2, then it is not necessary to newly provide a contact portion for flexing limiting for a spider 4 of the existing specification and therefore it is possible, against the flange portions 44, 43, to impose both the supporting function for the sealing members 15 and the flexing limiting function for the flange yoke 2 and the stab yoke 3. Since the flange portions 43 and 44 are formed with a diameter larger than the respective circumferential surfaces of the first shaft 41 and the second shaft 42, accordingly it is possible to limit the protruding heights of the protruding portion 6 of the flange yoke 2 and the protruding portion 7 of the stab yoke 3 for contacting.

Second Embodiment

Figure 7:
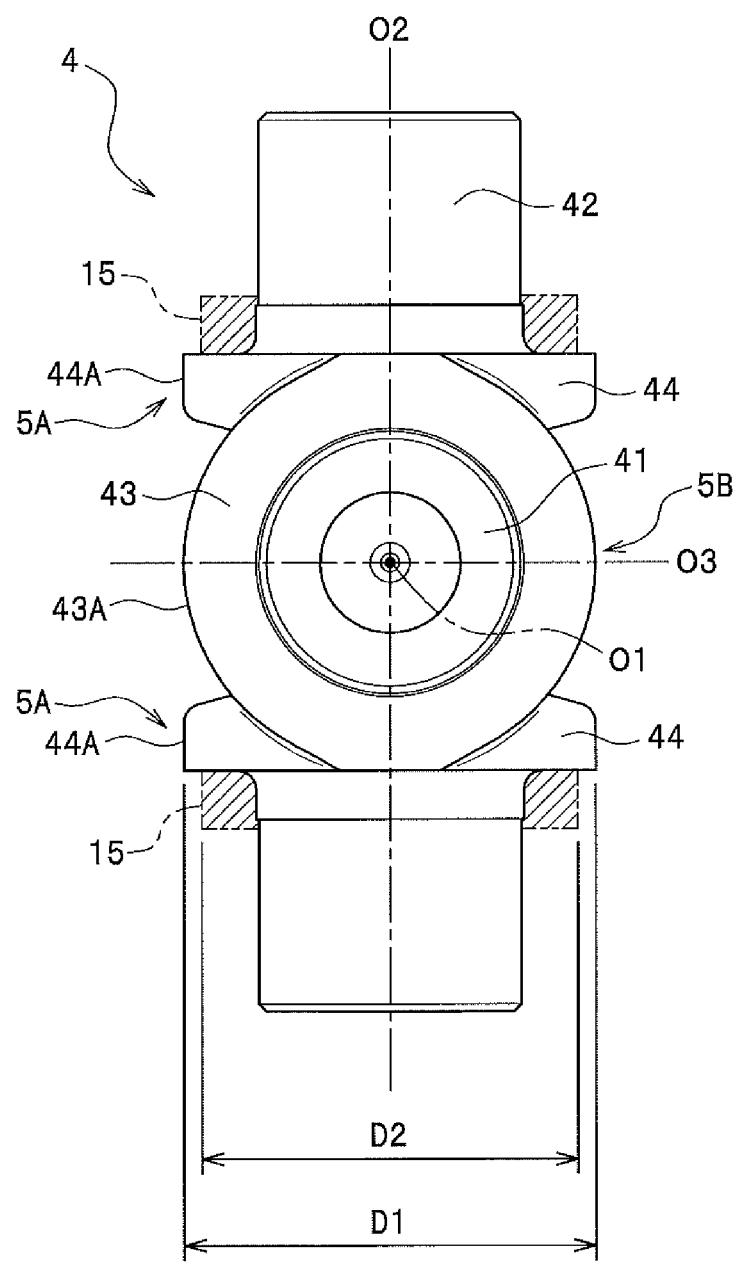
FIG. 7 shows a plan view of a spider of a second embodiment.

While in the first embodiment, the diameters of the flange portions 43, 44 and the diameters D2 of the sealing members 15 are of approximately same dimensions, in the second embodiment, as shown in FIG. 7, the diameters D1 of the flange portions 43, 44 are set to be larger than the diameters of the sealing members 15. Due to this configuration, it is so arranged that the protruding portions 6, 7 can surely be contacted only to the predetermined contact portions, the flange portions 43, 44, without any interference with the sealing members 15.

Third Embodiment

Figure 8:
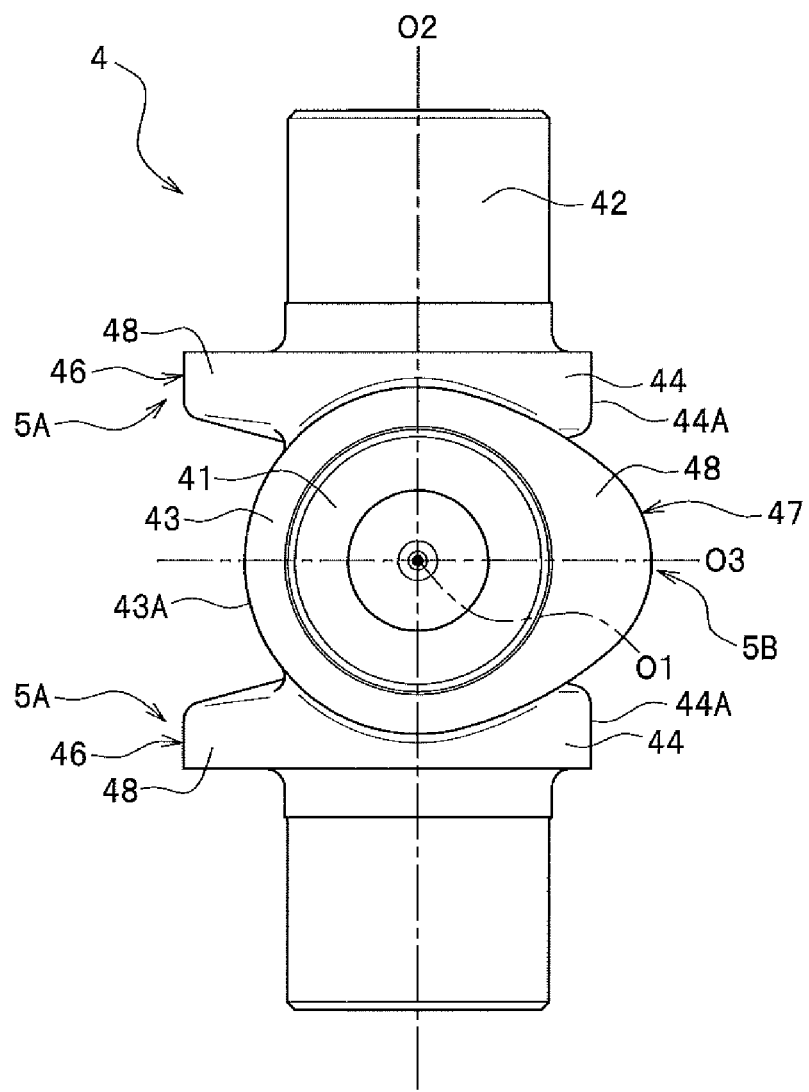
FIG. 8 shows a plan view of a spider of a third embodiment.

As shown in FIG. 8, the third embodiment is so configured that, on the flange portions 44, an extension portion 46, which extends towards the base end portion 21 of the flange yoke 2 contacting to the base end portion 21 (protruding portion 6), is formed, and an extension portion 47, which extends towards the base end portion 31 of the stab yoke 3 contacting to the base end portion 31 (protruding portion 7), is formed. The extension portions 46, 47 are configured respectively with a cam-shaped portion 48 which is smoothly bulging out from the circumferential surfaces 44A, 43A approximately in directions along tangential lines thereof.

Thereby, it is so arranged that, when the flange yoke 2 or the stab yoke 3 is flexed, the protruding portions 6, 7 can surely be contacted only to a predetermined contact portion, namely a tip portion of the cam-shaped portion 48, while keeping the outer diameter of the flange portions 44, 43 approximately same as the outer diameter of the sealing member 15, without any interference with the sealing members 15. Since it is enough to form a cam-shaped portion 48 on a portion of the flange portion 44, 43, it is possible to limit a weight increase thereof, compared with the second embodiment in which the entire bodies of the flange portions 43, 44 are made large in size.

Fourth Embodiment

Figure 9:
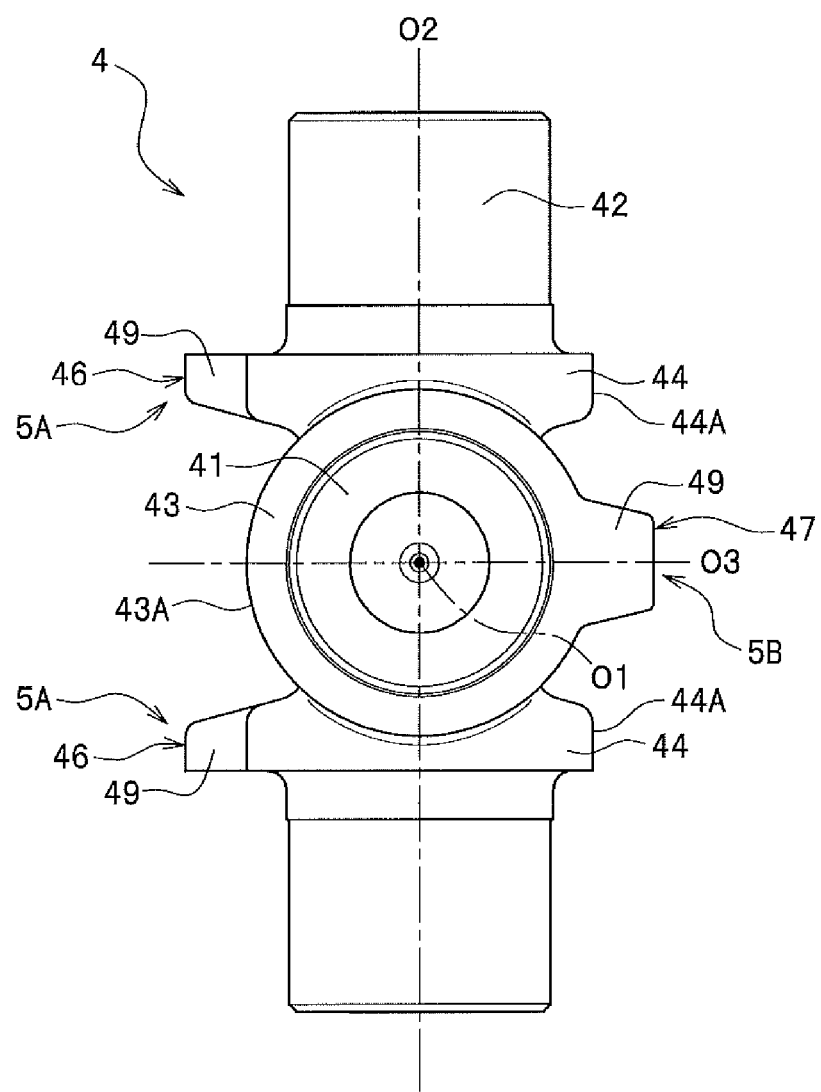
FIG. 9 shows a plan view of a spider of a fourth embodiment.

As shown in FIG. 9, again the fourth embodiment is so configured that, on the flange portions 44, an extension portion 46, which extends towards the base end portion 21 of the flange yoke 2, contacting to the base end portion 21 (protruding portion 6), is formed, and an extension portion 47, which extends towards the base end portion 31 of the stab yoke 3, contacting to the base end portion 31 (protruding portion 7), is formed. While, in the third embodiment, the extension portions 46, 47 are of the cam-shaped portions 48, in the fourth embodiment, the extension portions 46, 47 are configured respectively with a stepped protruding portion 49, of which portion protruding with a step from the circumferential surface 44A, 43A of the flange portion 44, 43.

Thereby, it is so arranged that, when the flange yoke 2 or the stab yoke 3 is flexed, the protruding portions 6, 7 can surely be contacted only to the predetermined contact portions, namely a tip portion of the cam-shaped portion 49, keeping the outer diameter of the flange portions 44, 43 approximately same as the outer diameter of the sealing member 15, without any interference with the sealing members 15. Since it is also sufficient with that a cam-shaped portions 49 is formed on a portion of the flange portion 44, 43, it is possible to limit a weight increase thereof, compared with the second embodiment in which the entire bodies of the flange portions 43, 44 are made large in size.

In the above, the preferred embodiments of a universal joint related to the present invention are explained. According to the propeller shaft 60 comprising the universal joint 1 of the present invention, it is possible to limit an excessive flexing of the propeller shaft at the universal joint 1 by virtue of the flexing limiting portions 5A, 5B. Therefore, it is possible to apply a predetermined load to a weak portion arranged at the propeller shaft 60, by which the desired contraction function or fall-out function arranged at the weak portion can be well exerted.

For the universal joint 1, the shapes of the protruding portions 6 of the flange yoke 2 and the protruding portions 7 of the stab yoke 3 are not limited to a general square shape, and any shape will be accepted, if it protrudes towards the spider 4 and comes into contact with the spider 4.

REFERENCE SIGNS LIST 1 universal joint
2 flange yoke (first yoke)
3 stab yoke (second yoke)
4 spider
5A, 5B flexing limiting portion
6, 7 protruding portion
11, 12 bearing
15 sealing member
21 base end portion
22 arm portion
23 shaft hole
24 flange
31 base end portion
32 arm portion
33 shaft hole
41 first shaft
42 second shaft
43, 44 flange portion
46, 47 extension portion
60 propeller shaft

The invention claimed is:

1. A universal joint, comprising:
a first yoke and a second yoke, each comprising a based end portion, and a pair of arm portions having a shaft hole and extending from both sides of the base end portion, and
a spider having a first shaft fitted into the shaft hole of the first yoke and a second shaft fitted into the shaft hole of the second yoke,
wherein the universal joint further comprises a flexing limiting portion, which limits a flexing angle of the universal joint due to mutual contact of the base end portion and the spider when at least one yoke among the first and second yokes is flexed to a predetermined angle, wherein, a bearing is provided between the spider and the shaft hole,
wherein the spider is formed with a flange portion supporting a sealing member for the bearing, and
wherein the flexing limiting portion on a side of the spider is constituted with a protruding portion formed at the one of the yokes and a flange portion of a shaft which pivotally supports the other yoke wherein the sealing member is provided at an end of the bearing, and
wherein the protruding portion is configured to engage with a circumferential surface of the flange portion.

2. The universal joint according to claim 1, wherein the flexing limiting portion on a side of a yoke is constituted with a protruding portion formed at a base end portion of the yoke.

3. The universal joint according to claim 2, wherein an outer diameter of the flexing limiting portion is larger than an outer diameter of the sealing member.

4. The universal joint according to claim 2, wherein in the flange portion of the flexing limiting portion, an extension portion is formed, extending to a base end portion of one yoke and coming into contact with the base end portion.

5. The universal joint according to claim 1, wherein an outer diameter of the flexing limiting portion is larger than an outer diameter of the sealing member.

6. The universal joint according to claim 1, wherein in the flange portion of the flexing limiting portion, an extension portion is formed, extending to a base end portion of one yoke and coming into contact with the base end portion.

7. The universal joint according to claim 1, wherein the one yoke is a flange yoke having a flange which extends in radial direction from a base end portion to outer side and is fastened to a transmission member with bolts.

8. A propeller shaft comprising the universal joint according to claim 1.

* * * * *